United States Patent
Suzuki

(10) Patent No.: US 8,044,803 B2
(45) Date of Patent: Oct. 25, 2011

(54) ARTICLE SALES DATA PROCESSING APPARATUS

(75) Inventor: Shigeaki Suzuki, Izu (JP)

(73) Assignee: Toshiba Tec Kabishiki Kaisha (JP)

( * ) Notice: Subject to any disclaimer, the term of this patent is extended or adjusted under 35 U.S.C. 154(b) by 328 days.

(21) Appl. No.: 12/218,162

(22) Filed: Jul. 11, 2008

(65) Prior Publication Data

US 2009/0027205 A1    Jan. 29, 2009

(30) Foreign Application Priority Data

Jul. 26, 2007    (JP) ................................. 2007-194832

(51) Int. Cl.
*G08B 13/14* (2006.01)
(52) U.S. Cl. ............... 340/572.3; 340/572.1; 340/572.7; 705/16; 705/23
(58) Field of Classification Search ............... 340/572.1, 340/572.3, 572.7; 705/23
See application file for complete search history.

(56) References Cited

U.S. PATENT DOCUMENTS

| | | | |
|---|---|---|---|
| 6,169,483 B1 * | 1/2001 | Ghaffari et al. | 340/572.3 |
| 6,507,279 B2 * | 1/2003 | Loof | 340/572.1 |
| 6,788,205 B1 | 9/2004 | Mason et al. | |
| 6,809,645 B1 * | 10/2004 | Mason | 340/572.1 |
| 6,837,428 B2 * | 1/2005 | Lee et al. | 235/383 |
| 6,933,848 B1 * | 8/2005 | Stewart et al. | 340/572.3 |
| 7,173,528 B1 * | 2/2007 | Stewart et al. | 340/572.3 |
| 7,411,503 B2 * | 8/2008 | Stewart et al. | 340/572.1 |
| 7,528,721 B2 * | 5/2009 | Levin et al. | 340/572.1 |
| RE41,717 E * | 9/2010 | Dejaeger | 235/383 |
| 2005/0098621 A1 | 5/2005 | de Sylva | |
| 2005/0131763 A1 * | 6/2005 | Junger | 705/23 |
| 2005/0165784 A1 * | 7/2005 | Gomez et al. | 707/9 |
| 2006/0061475 A1 * | 3/2006 | Moskowitz et al. | 340/572.3 |
| 2006/0131375 A1 | 6/2006 | Myllymaki | |
| 2006/0132313 A1 * | 6/2006 | Moskowitz | 340/572.7 |
| 2006/0145857 A1 | 7/2006 | Ono | |

FOREIGN PATENT DOCUMENTS

| | | |
|---|---|---|
| CN | 1794271 | 6/2006 |
| EP | 1 429 301 | 6/2004 |
| EP | 1 538 556 | 6/2005 |
| JP | 2005-339353 | 12/2005 |
| JP | 2006-178770 | 7/2006 |
| WO | 2004-023387 | 3/2004 |

OTHER PUBLICATIONS

Juels, Ari et al., "The Blocker Tag: Selective Blocking of RFID Tags for Consumer Privacy", Oct. 27-30, 2003, Washington, D.C.

* cited by examiner

*Primary Examiner* — Benjamin C Lee
*Assistant Examiner* — Peter Mehravari
(74) *Attorney, Agent, or Firm* — Harness, Dickey & Pierce, P.L.C.

(57) ABSTRACT

An article sales data processing apparatus comprises a wireless tag reading unit configured to read data in a wireless tag attached to an article, a processing unit configured to process sales data for the article sold as one transaction, on the basis of the data in the wireless tag read in the wireless tag reading unit, a judgment unit configured to judge whether to invalidate each of the wireless tags whose data has been read in the wireless tag reading unit, and an invalidation unit configured to invalidate the wireless tag judged to be invalidated by the judgment unit.

20 Claims, 6 Drawing Sheets

| ID | Article code, article name, unit price, etc. |

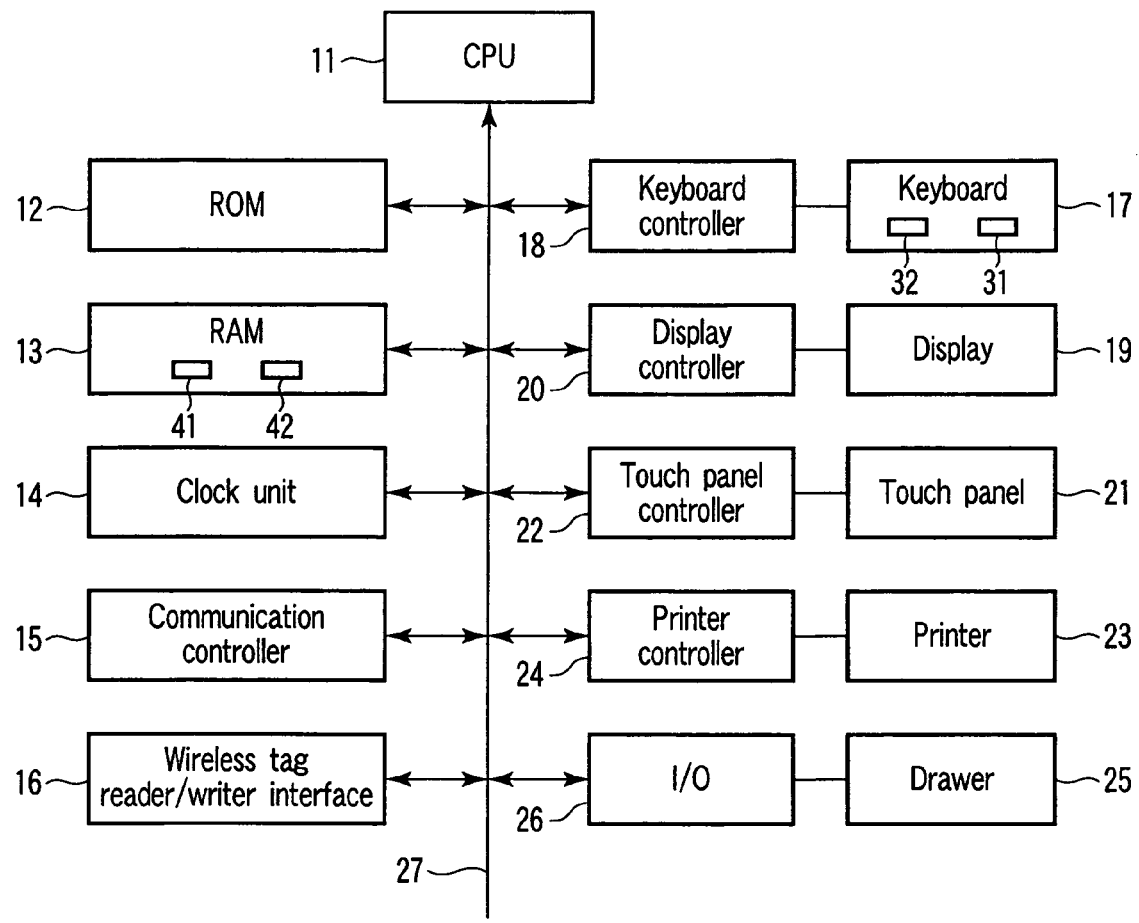
F I G. 3

| Article code | Article name | Unit price | Number of items sold | Amount sold |
|---|---|---|---|---|
| | | | | |
| | | | | |
| | | | | |
| | | | | |
| ⋮ | ⋮ | ⋮ | ⋮ | ⋮ |
| | | Total | N | M |

FIG. 4

| No | Wireless tag data | Delete flag |
|---|---|---|
| 1 | | |
| 2 | | |
| 3 | | |
| 4 | | |
| ⋮ | ⋮ | ⋮ |

FIG. 5

| Article name | Registration Unit price | Number | YYYY-MM-DD Amount |
|---|---|---|---|
| Article AAA | ¥210 | 1 | ¥210 |
| Article BBB | ¥105 | 1 | ¥105 |
| Article CCC | ¥315 | 2 | ¥630 |
| Article DDD | ¥420 | 1 | ¥420 |
| Article EEE | ¥105 | 3 | ¥315 |
| | Total | 8 | ¥1,680 |

FIG. 8

| Article name | Registration Unit price | Number | YYYY-MM-DD Amount |
|---|---|---|---|
| ☐ Article AAA | ¥210 | 1 | ¥210 |
| ☐ Article BBB | ¥105 | 1 | ¥105 |
| ☐ Article CCC | ¥315 | 2 | ¥630 |
| ☐ Article DDD | ¥420 | 1 | ¥420 |
| ☐ Article EEE | ¥105 | 3 | ¥315 |
| | Total | 8 | ¥1,680 |

Select article for which data in wireless tag is not to be deleted

FIG. 9

ARTICLE SALES DATA PROCESSING APPARATUS

CROSS-REFERENCE TO RELATED APPLICATIONS

This application is based upon and claims the benefit of priority from prior Japanese Patent Application No. 2007-194832, filed Jul. 26, 2007, the entire contents of which are incorporated herein by reference.

BACKGROUND OF THE INVENTION

1. Field of the Invention

The present invention relates to an article sales data processing apparatus which processes sales data for an article sold as one transaction, on the basis of data in a wireless tag attached to the article.

2. Description of the Related Art

Recently, development of a checkout system using wireless tags has been advanced in the distribution industry. In this system, a wireless tag is attached to each article. A memory of the wireless tag stores article data such as an article code for the identification of the article to which the wireless tag is attached. A wireless tag reader is connected to an article sales data processing apparatus such as a point of sales (POS) terminal. An antenna of the wireless tag reader is provided in the vicinity of a checkout counter.

A customer who pays the bill in the checkout system having such a configuration places on the checkout counter all articles to purchase. The wireless tag attached to each article then communicates with the antenna. Data in each wireless tag is then read by the wireless tag reader. The read data in each wireless tag is sent to the article sales data processing apparatus. The article sales data processing apparatus specifies the articles purchased by the customer in accordance with the data in the wireless tags. Then, sales data for the purchased articles are processed.

In the case of a conventional checkout system using, for example, bercodes, an operator has to perform the operation of reading the bercodes attached to the articles one by one with a scanner. On the contrary, in the case of a checkout system using the wireless tags, the wireless tag reader can collectively read data in the wireless tags attached to a plurality of articles. This allows a drastic reduction in the labor and time required for accounting.

The wireless tag reader reads data in the wireless tags by radio. Thus, the wireless tag reader can read data in the wireless tags in a noncontact manner even from a certain distance as long as it is within the range of wireless communication.

Therefore, if wireless tags are attached to all articles, there arises a problem of the invasion of privacy. Simply having a wireless tag reader enables anyone to know information on goods contained in bags of others without looking into it. Otherwise, it is possible to easily know information on clothes or accessories which others are wearing.

As proposed measures for preventing the invasion of privacy due to the wireless tags, there has heretofore been disclosed in Jpn. Pat. Appln. KOKAI Publication No. 2006-178770 a technique to stop the function of a wireless tag attached to an article when a customer purchases this article.

On the other hand, there has, however, also been devised a mechanism to make effective use of information in a wireless tag attached to an article after a consumer has purchased this article. For example, a mechanism is built to enable the wireless tag reader to read a wireless tag of a food article contained in a refrigerator from the outside of the refrigerator. It is thus possible for the consumer to identify the food articles in the refrigerator without opening the refrigerator. This makes it easy for the consumer to make out a menu or to create a shopping list.

BRIEF SUMMARY OF THE INVENTION

In the foregoing respect, there has been a demand that whether to stop the function of a wireless tag attached to an article can be specified on an article basis when a customer purchases this article. In other words, there has been a demand that it should be possible to easily invalidate the wireless tags attached to some of all articles purchased by a customer and not to invalidate the wireless tags attached to the rest of the articles.

According to one aspect of the present invention, an article sales data processing apparatus comprises: a wireless tag reading unit configured to read data in a wireless tag attached to an article; a processing unit configured to process sales data for the article sold as one transaction, on the basis of the data in the wireless tag read in the wireless tag reading unit; a judgment unit configured to judge whether to invalidate each of the wireless tags whose data has been read in the wireless tag reading unit; and an invalidation unit configured to invalidate the wireless tag judged to be invalidated by the judgment unit.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram showing the configuration of a POS terminal;

FIG. 4 is a diagram showing the area structure of an article item buffer formed in a RAM of the POS terminal;

FIG. 5 is a diagram showing the area structure of a wireless tag data buffer formed in the RAM of the POS terminal;

FIG. 8 is a diagram showing one example of a registration screen displayed on a touch panel of the POS terminal; and FIG. 9 is a diagram showing another example of the registration screen displayed on the touch panel of the POS terminal.

DETAILED DESCRIPTION OF THE INVENTION

A best mode for carrying out the present invention will hereinafter be described with the drawings. It is to be noted that this embodiment concerns a case where the present invention is applied to an article sales data processing apparatus of a checkout system using wireless tags.

Figures 1, 2:
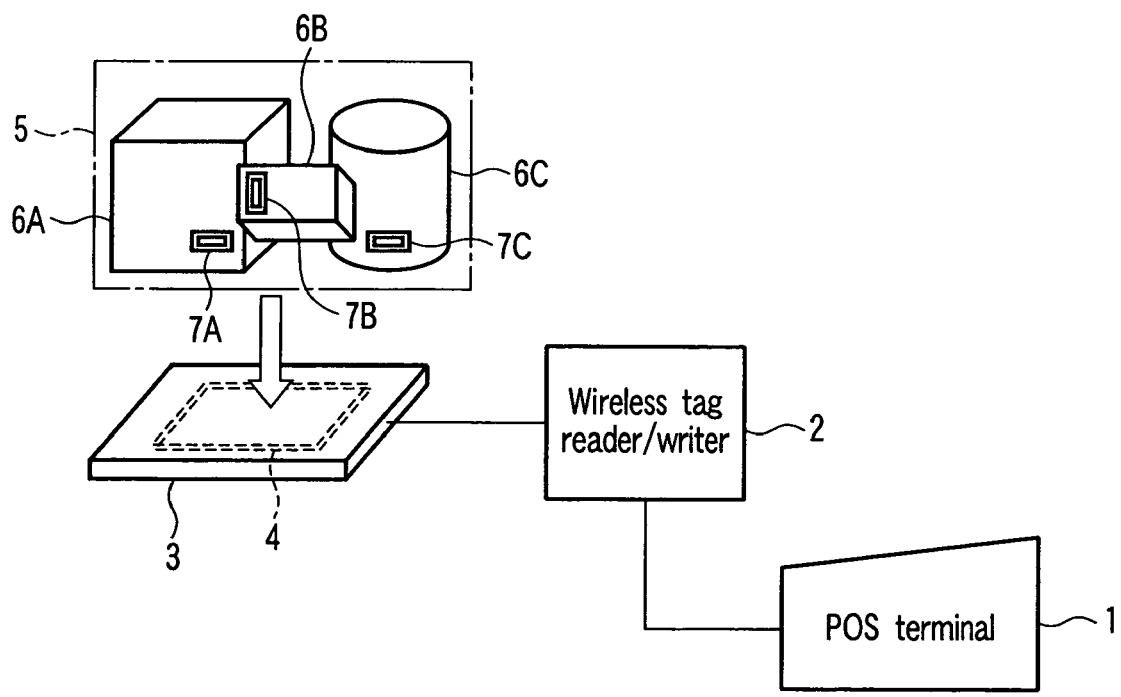
FIG. 1 is a diagram showing the configuration of a checkout system in one embodiment of the present invention.
FIG. 2 is a diagram showing the structure of data stored in an article tag.

The configuration of the checkout system in the present embodiment is described with FIG. 1. This system comprises a point of sales (POS) terminal 1, a wireless tag reader/writer 2 and an antenna 4. The wireless tag reader/writer 2 is connected to the POS terminal 1. The antenna 4 is connected to the wireless tag reader/writer 2.

The antenna 4 is embedded in a tag antenna plate 3. One plane of the tag antenna plate 3 configures part of the upper surface of an unshown checkout counter. A container 5 such as a shopping basket is placed on the checkout counter. The container 5 contains articles 6 (6A, 6B, 6C) to be purchased by a shopper. A wireless tag 7 (7A, 7B, 7C) is attached to each of the articles 6 (6A, 6B, 6C). In addition, the articles 6 do not necessarily have to be contained in the container 5.

The wireless tag reader/writer 2 wirelessly communicates with the wireless tags 7 present in a communication area of the antenna 4 to read in a noncontact manner wireless tag data stored in memories of the wireless tags 7. The wireless tag reader/writer 2 has an anti-collision function. This function enables the collective reading of the data in the plurality of wireless tags 7.

The data in the wireless tags 7 read by the wireless tag reader/writer 2 are sequentially transmitted to the POS terminal 1. The POS terminal 1 processes sales data for the articles 6 on the basis of the data in the wireless tags 7.

The wireless tag 7 is also referred to as an electronic tag, radio frequency identification (RFID), IC tag, etc., and has already been in practical use. In the present embodiment, each wireless tag attached to each of the articles 6 is referred to as the article tag 7. As shown in FIG. 2, an ID inherent to the tag and article information are stored as wireless tag data in the memory of the article tag 7. For example, a serial number set at the manufacture of the tag servers as the ID. The article information includes an article code, article name, unit price, etc., of the article 6 to which the article tag 7 is attached.

The article code is a code inherent to the article which has been set for each article 6 to identify the kind of each article 6. That is, the same article code is set for the articles of the same kind. However, the IDs of the wireless tags 7 attached to the articles of the same kind are different. Therefore, the POS terminal 1 can recognize the article code contained in the data read from the wireless tag 7 to identify the kind of article 6 to which this article tag 7 is attached. Moreover, the recognition of the ID of the article tag 7 enables the individual identification of the article.

The POS terminal 1 is one aspect of the article sales data processing apparatus, and its configuration is described using a block diagram in FIG. 3.

The POS terminal 1 is equipped with a central processing unit (CPU) 11 as a control main unit. Then, connected to the CPU 11 via a bus line 27 are a ROM 12, a RAM 13, a clock unit 14, a communication controller 15, a wireless tag reader/writer interface 16, a keyboard controller 18, a display controller 20, a touch panel controller 22, a printer controller 24 and an I/O port 26.

The clock unit 14 clocks the current date and time. The communication controller 15 controls a data communication with a store server connected online. The wireless tag reader/writer interface 16 communicates with the wireless tag reader/writer 2.

The keyboard controller 18 controls a keyboard 17. The keyboard 17 is provided with at least a checkout key 31 for declaring the checkout of one transaction, and a delete key 32 for commanding invalidation of a wireless tag.

The display controller 20 controls a display 19. The touch panel controller 22 controls a touch panel 21. The display 19 is used as a unit for displaying transaction information to a cashier. The touch panel 21 is used as a unit for displaying the transaction information to a shopper.

The printer controller 24 controls a printer 23 for receipt printing. The I/O port 26 outputs a drive signal to a drawer 25 for storing cash, etc.

Fixed data for a program, etc., has previously been stored in the ROM 12. In the RAM 13, various memory areas are formed to store variable data such as input data, computation data, etc.

The POS terminal comprises an article item buffer 41 capable of storing and retaining a plurality of article sales data, and a wireless tag data buffer 42 capable of storing and retaining a plurality of wireless tag data. These buffers 41, 42 are formed in the RAM 13.

As shown in FIG. 4, the article item buffer 41 has an area for storing a plurality of article sales data, and an area for storing a total number N and a total amount M of the article sales data. The article sales data is composed of an article code, article name, unit price, number of items sold, and an amount sold.

As shown in FIG. 5, the wireless tag data buffer 42 has an area for storing a plurality of wireless tag data. A delete flag is attached to each of the wireless tag data. Here, the wireless tag data buffer 42 constitutes a tag data storage unit.

Figure 6:
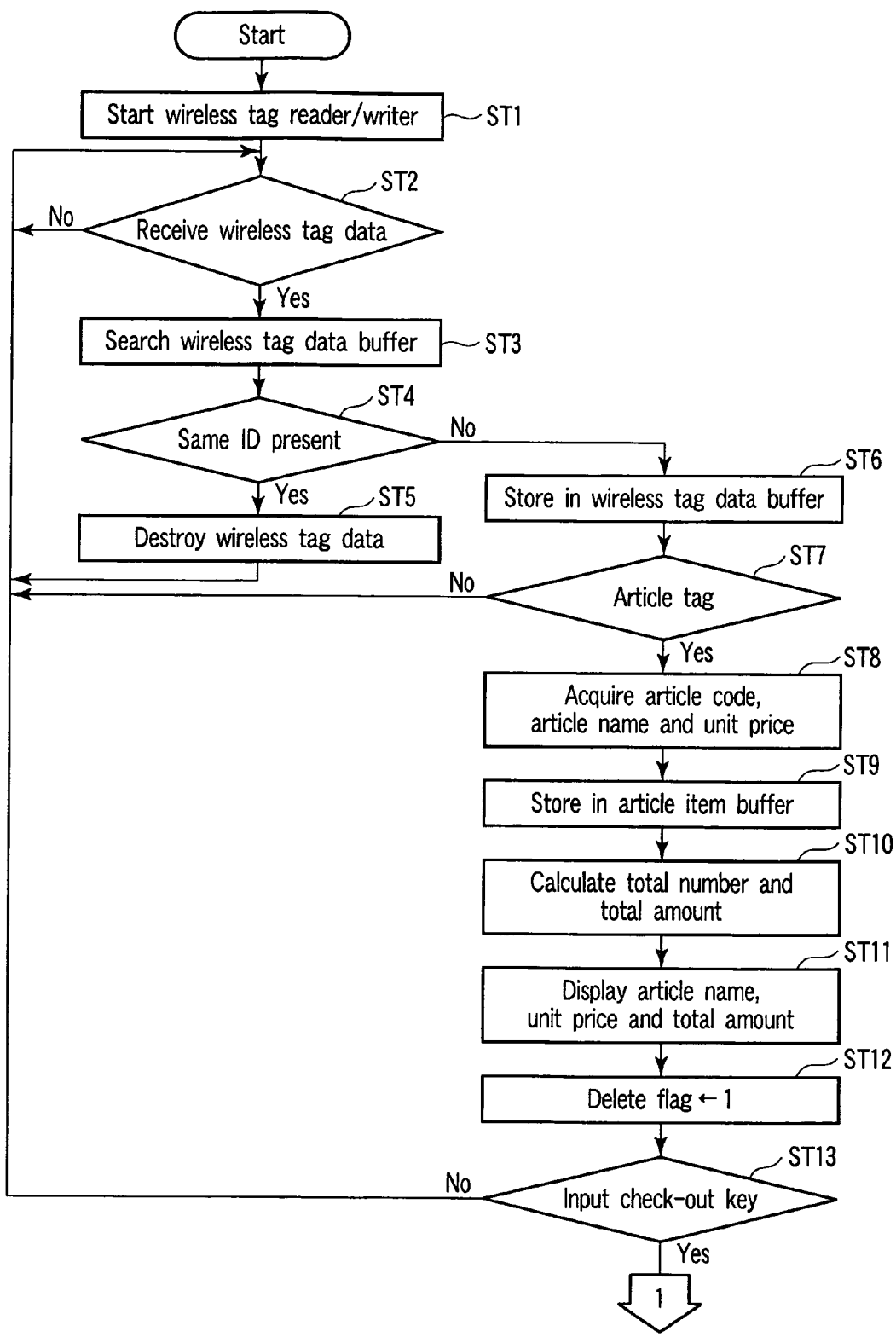
FIG. 6 is a flowchart showing a procedure before the input of a checkout key in control processing performed by a CPU of the POS terminal.
Figure 7:
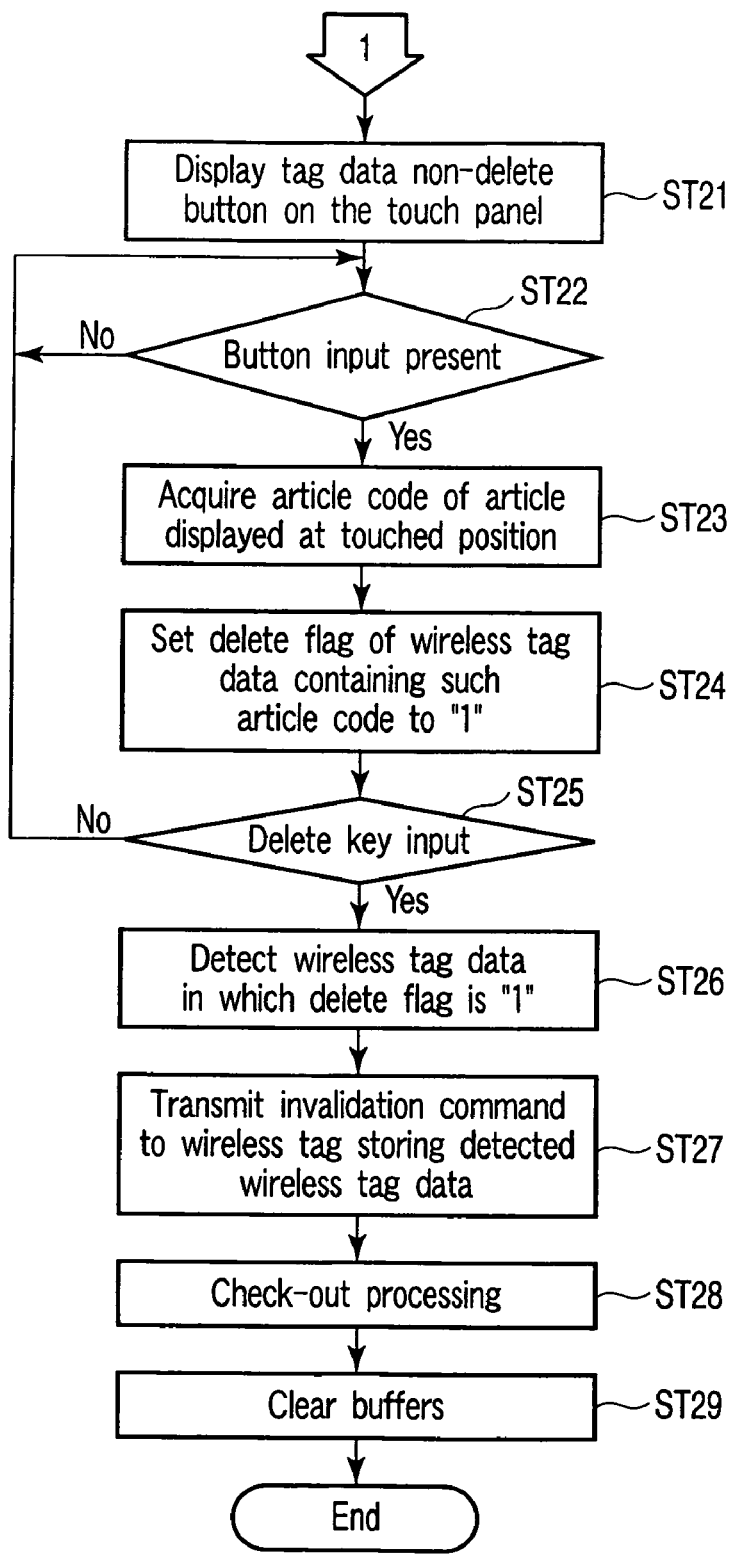
FIG. 7 is a flowchart showing a procedure after the input of the checkout key in the control processing performed by the CPU of the POS terminal.

The POS terminal 1 operates in accordance with a procedure shown in flowcharts of FIG. 6 and FIG. 7 for a transaction with one customer. This operation is controlled by the CPU 11 in accordance with the program stored in the ROM 12.

When the container 5 containing the articles 6 to be purchased by the customer is placed on the tag antenna plate 3, the CPU 11 starts this operation. In addition, a method of judging whether the container 5 has been placed on the tag antenna plate 3 includes a method using a sensor, a method using a key, etc.

For example, the container 5 on the tag antenna plate 3 is detectable by a weight sensor or an optical sensor. A detection signal of the sensor is transmitted to the CPU 11. The CPU 11 judges whether the container 5 has been placed on the tag antenna plate 3 in accordance with the presence of the detection signal.

Alternatively, a start key is provided in the keyboard 17. When the container 5 is placed on the tag antenna plate 3, the cashier inputs the start key. The CPU 11 judges whether the container 5 has been placed on the tag antenna plate 3 in accordance with the presence of the input of the start key.

When this control is started, the CPU 11 commands starting of the wireless tag reader/writer 2 in step ST1. This command is transmitted to the wireless tag reader/writer 2 via the wireless tag reader/writer interface 16.

On receipt of the command for starting, the wireless tag reader/writer 2 modulates a carrier wave with a read signal for reading the wireless tag. The modulated wave signal is emitted as a radio wave from the antenna 4. On receipt of the radio wave, the wireless tag 7 returns an answering wave. The answering wave contains the wireless tag data.

When the answering wave from the wireless tag 7 is received in the antenna 4, the wireless tag reader/writer 2 demodulates the wireless tag data from the answering wave. The demodulated wireless tag data is transmitted to the POS terminal 1.

The CPU 11 waits for the wireless tag data in step ST2. On receipt of the wireless tag data from the wireless tag reader/writer 2, the CPU 11 searches the wireless tag data buffer 42 in step ST3. The CPU 11 then judges in step ST4 whether the same data as the received wireless tag data is stored in the wireless tag data buffer 42.

Specifically, the CPU 11 searches the wireless tag data buffer 42 for an ID inherent to the tag contained in the received wireless tag data. The CPU 11 then judges whether wireless tag data containing the same ID has already been stored. When such wireless tag data has been stored, the CPU 11 judges that the same data is present. When such wireless tag data has not been stored, the CPU 11 judges that the same data is not present.

When it has been judged that the same data is present, the CPU 11 destroys the received wireless tag data in step ST5. The CPU 11 returns to the processing in step ST2, and waits for the next wireless tag data.

When it has been judged that the same data is not present, the CPU 11 stores the received wireless tag data in the wireless tag data buffer 42 in step ST6. The CPU 11 then judges in step ST7 whether the wireless tag data is the data read from the article tag 7. When the wireless tag data contains article information such as the article code, article name, unit price, etc., the CPU 11 judges that the wireless tag data is the data read from the article tag 7.

When the wireless tag data is not the data read from the article tag 7, the CPU 11 returns to the processing in step ST2, and waits for the next wireless tag data.

When the wireless tag data is the data read from the article tag 7, the CPU 11 acquires the article code, article name and unit price from the wireless tag data in step ST8. The CPU 11 then generates article sales data using the acquired article code, article name and unit price in step ST9. The number of items sold in the article sales data is "1". The amount sold is calculated by multiplying the unit price by the number of items sold.

The CPU 11 judges whether article sales data with the same article code, article name and unit price is stored in the article item buffer 41. If not, the CPU 11 adds the currently generated article sales data to the article item buffer 41.

If such data is stored, the CPU 11 adds the number of items sold and amount sold of the currently generated article sales data to the number of items sold and amount sold of the same article sales data.

The CPU 11 calculates the total number N and total amount M of the article sales data stored in the article item buffer 41 in step ST10. The CPU 11 then displays the article sales data in the article item buffer 41 and the total number N and total amount M on the display 19 and the touch panel 21 in step ST11.

In step ST12, the CPU 11 sets a delete flag "1" in the wireless tag data stored in the wireless tag data buffer 42 in the current processing in step ST6.

In step ST13, the CPU 11 judges whether the checkout key 31 for declaring the termination of one transaction has been input. When the checkout key 31 has not been input, the CPU 11 returns to the processing in step ST2. The CPU 11 waits for the next wireless tag data.

One example of a screen 51 displayed on the touch panel 21 at this point is shown in FIG. 8. This screen example shows a point where data in the article tags 7 attached to the following articles have been read as one transaction: one article AAA at a unit price of 210 yen, one article BBB at a unit price of 105 yen, two articles CCC at a unit price of 315 yen, one article DDD at a unit price of 420 yen, and three articles EEE at a unit price of 105 yen.

When the checkout key 31 has been input, the CPU 11 proceeds to the processing in step ST21 in FIG. 7. The CPU 11 displays a tag data non-delete button 52 corresponding to each of the article sales data (the article name, unit price, number of items sold, amount sold) displayed on the touch panel 21. In step ST22, the CPU 11 then waits for any of the buttons 52 to be touched.

One example of the screen 51 displayed on the touch panel 21 at this point is shown in FIG. 9. In this screen example, the tag data non-delete buttons 52 are displayed to the left of the article names of the article sales data.

The CPU 11 judges whether any of the tag data non-delete buttons 52 has been input in accordance with a signal of the touch panel 21 input to the touch panel controller 22. When judging that the tag data non-delete button 52 has not been input, the CPU 11 proceeds to the processing in step ST25.

When judging that any of the tag data non-delete buttons 52 has been input, the CPU 11 acquires the article name corresponding to the input tag data non-delete button 52 in step ST23. The CPU 11 then searches the article item buffer 41 for this article name, and acquires an article code from the article sales data containing this article name.

When the article code has been acquired, the CPU 11 searches the wireless tag data buffer 42 for this article code in step ST24. Then, the delete flag of the wireless tag data containing this article code is reset to "0". Thereafter, the CPU 11 proceeds to the processing in step ST25.

In step ST25, the CPU 11 judges whether the delete key 32 has been input. When the delete key 32 has not been input, the CPU 11 returns to the processing in step ST22. The CPU 11 judges whether the next tag data non-delete button 52 has been input.

When the delete key 32 has been input, the CPU 11 sequentially detects from the wireless tag data buffer 42 the wireless tag data in which the delete flags are set to "1", in step ST26. Then, every time the relevant wireless tag data is detected, the wireless tag identified by the ID of this data is specified as an invalidation tag. The invalidation tag is the article tag 7 which has not been selected by the tag data non-delete button 52.

The CPU 11 generates an invalidation command for the ID of the invalidation tag in step ST27. The CPU 11 then controls the wireless tag reader/writer 2 to transmit this invalidation command by radio.

Owing to this control, the invalidation command is transmitted from the wireless tag reader/writer 2. The invalidation command is received by the wireless tag having the ID set by this command. The wireless tag which has received the invalidation command then stops the operation corresponding to the command from the wireless tag reader/writer 2. That is, the wireless tag is invalidated.

In the present embodiment, a KILL command is used as the invalidation command, that is, a command to invalidate the wireless tag. The KILL command is standardized by a communication protocol.

The CPU 11 transmits the invalidation commands to all the article tags 7 specified by the IDs of the wireless tag data in which the delete flags are set to "1". When the transmission of the invalidation commands has been completed, the CPU 11 performs the processing to close the transaction in step ST28. In response to the checkout processing, one transaction is settled on the basis of the article sales data stored in the article item buffer 41. Moreover, an amount of charge is calculated, and displayed on the display 19 and the touch panel 21. Further, the printer 23 is actuated, and a receipt is printed and issued. Printed on the receipt is transaction statement data, such as the article name, number of items sold, amount sold stored in the article item buffer 41, and the total number of items sold, total amount, etc.

When the checkout processing has been completed, the CPU 11 clears the article item buffer 41 and the wireless tag data buffer 42 in step ST29. This concludes the processing for one transaction.

In the present embodiment, the articles to be processed as one transaction, that is, all the articles to be purchased by one customer are placed on the tag antenna plate 3. Then, data in the wireless tags which are the article tags 7 attached to the respective articles are read by the wireless tag reader/writer 2. The wireless tag data in the article tags 7 are stored in the wireless tag data buffer 42. At this point, the delete flag added to the wireless tag data in each article tag 7 is set to "1" which is a state where the deletion of data is validated.

Furthermore, the article sales data including the article code, article name, unit price, number of items sold and amount sold of each article is stored in the article item buffer 41. Then, the registration screen 51 as shown in FIG. 8 is displayed on the cashier display 19 and the customer touch panel 21.

The cashier checks the contents of the screen 51 displayed on the display 19 against the articles placed on the tag antenna plate 3. When there is no excess or deficiency, the cashier inputs the checkout key 31.

When the checkout key 31 is input, the screen displayed on the customer touch panel 21 changes from the state in FIG. 8 to the state in FIG. 9. That is, the tag data non-delete buttons 52 are displayed for the respective articles purchased.

Then, the cashier explains to the customer that the data in the article tag 7 attached to each article is automatically deleted and that when there is an article for which the data in the article tag 7 should not be deleted, the tag data non-delete button 52 displayed next to the name of that article is to be touched.

A customer having an article for which the wireless tag data should not be deleted touches the button 52 displayed next to the name of that article. Thus, in the wireless tag data buffer 42, the delete flag added to the wireless tag data for the article tag 7 attached to the article whose button 52 has been touched is reset to "0" which is a state where the deletion of data is invalidated.

The cashier depresses the delete key 32. Then, the wireless tag data for the article tag 7 in which the delete flag is set to "1" is detected from the wireless tag data buffer 42. Then, the invalidation command is transmitted from the antenna 4 of the wireless tag reader/writer 2 to the article tag 7 specified by the ID in this wireless tag data.

When the invalidation command has been transmitted, the article tag 7 specified by the ID of the invalidation command is invalidated among the article tags 7 attached to the respective articles placed on the tag antenna plate 3. That is, the article tag 7 attached to the article for which the customer himself has not input the tag data non-delete button 52 is invalidated. Thereafter, the invalidated article tag 7 stops the operation corresponding to the command from the wireless tag reader/writer 2. Therefore, it is possible to prevent the information on the articles that one has purchased from being known to others.

On the other hand, the article tag 7 which is not specified by the ID of the invalidation command is not invalidated. That is, the article tag 7 attached to the article for which the customer himself has input the tag data non-delete button 52 is not invalidated. Therefore, the customer can make effective use of information in a wireless tag attached to an article after the purchase of the article. For example, a wireless tag of a food article contained in a refrigerator is read from the outside of the refrigerator, such that the food articles in the refrigerator can be identified without opening the refrigerator. This makes it easy to make out a menu or to create a shopping list.

Thus, it is possible to easily invalidate the wireless tags attached to some of all articles purchased by a customer and not to invalidate the wireless tags attached to the rest of the articles. This increases the practicality of the checkout system using the wireless tags.

In addition, this invention is not directly limited to the embodiment described above, and the components can be modified and embodied at the stage of carrying out the invention without departing from the spirit thereof.

For example, in the embodiment described above, the article tag 7 of the article corresponding to the button 52 operated from the registration screen 51 is not invalidated. However, the article tag 7 of the article corresponding to the operated button 52 may otherwise be invalidated. This embodiment can be accomplished if the delete flag is reset to "0" in the processing in step ST12 in FIG. 6 and if the delete flag is set to "1" in the processing in step ST24 in FIG. 7.

The touch panel 21 is used as the display for a customer in the embodiment described above. However, the touch panel 21 may be used as the display for a cashier so that the cashier inputs the article which the customer desires to validate or invalidate. Moreover, instead of using the touch panel 21, the keyboard 17 may be operated to input the article which the customer desires to validate or invalidate. This permits a display other than the touch panel 21 to be used for the cashier or the customer.

The KILL command has been shown as an example of an invalidation command to invalidate the wireless tag in the embodiment described above. However, the invalidation command is not limited to the KILL command. For example, a write command may be transmitted as an invalidation command to the wireless tag to be invalidated so that all memory data therein may be overwritten and set to "0".

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An article sales data processing apparatus comprising:
a wireless tag reading unit configured to read data in a wireless tag attached to an article;
a processing unit configured to process sales data for the article sold as one transaction, on the basis of the data in the wireless tag read in the wireless tag reading unit;
a sales data storage unit configured to store the sales data for the article sold as one transaction;
a display configured to display the article sales data stored in the sales data storage unit;
a checkout key configured to declare the checkout of one transaction;
a selection accepting unit configured to accept an input on whether to select each sales data displayed on the display when the checkout key is entered and change the display so that it is configured to receive the input from the user after the checkout key is entered, the input corresponding to the user's selection of sales data;
a judgment unit configured to judge the wireless tag of an article whose sales data has been selected by the selection accepting unit as a tag to be invalidated, and the wireless tag of an article whose sales data has not been selected by the selection accepting unit as a tag not to be invalidated;

an invalidation unit configured to collectively invalidate all wireless tags judged to be invalidated by the judgment unit; and a checkout processing unit configured to execute checkout process of one transaction after invalidating the wireless tag which has been judged to be invalidated by the invalidation unit.

2. The article sales data processing apparatus according to claim 1, wherein the display unit is a touch panel, and the selection accepting unit accepts touch-input sales data to be selected out of the sales data displayed on the touch panel after the checkout key is entered and the display is configured to receive the input from the user.

3. The article sales data processing apparatus according to claim 1, further comprising:

a tag data storage unit configured to store the data in the wireless tag read in the wireless tag reading unit, wherein the wireless tag stores an ID to identify the tag and an article code to identify the article to which the tag is attached, and the judgment unit searches the tag data storage unit for the article code of the article for which the sales data has been selected in the selection accepting unit, and judges to invalidate the wireless tag identified by the ID of the tag data containing this article code.

4. The article sales data processing apparatus according to claim 1, wherein the judgment unit judges the wireless tag of an article whose sales data has not been selected by the selection accepting unit as a tag to be invalidated, and the wireless tag of an article whose sales data has been selected by the selection accepting unit as a tag not to be invalidated.

5. The article sales data processing apparatus according to claim 4, wherein the display unit is a touch panel, and the selection accepting unit accepts touched sales data not to be selected out of the sales data displayed on the touch panel after the checkout key is entered and the display is configured to receive the input from the user.

6. The article sales data processing apparatus according to claim 4, further comprising:

a tag data storage unit configured to store the data in the wireless tag read in the wireless tag reading unit, wherein the wireless tag stores an ID to identify this tag and an article code to identify the article to which this tag is attached, and the judgment unit searches the tag data storage unit for the article code of the article for which the sales data has not been selected in the selection accepting unit, and judges to invalidate the wireless tag identified by the ID of the tag data containing this article code.

7. The article sales data processing apparatus according to claim 1, wherein the invalidation unit transmits, to the wireless tag judged to be invalidated, an invalidation command from the wireless tag reading unit.

8. The article sales data processing apparatus according to claim 4, wherein the invalidation unit transmits, to the wireless tag judged to be invalidated, an invalidation command from the wireless tag reading unit.

9. An article sales data processing apparatus comprising:

a wireless tag reading unit configured to collectively read sales data in a plurality of wireless tags, each tag is attached to one of a plurality of different articles for sale, the sales data in each tag identifies the article that the tag is attached to;

a processing unit configured to receive the sales data collectively read by the wireless tag reading unit and process the sales data for each of the articles together as a single sale transaction;

a display configured to collectively display the sales data read by the wireless tag reading unit and identify each article associated with the sales data;

a checkout key configured to initiate a purchase transaction;

a selection accepting unit configured to prompt a user of the apparatus to select any one or more of the articles displayed on the display after the checkout key is entered, and change the display after the checkout key is entered so that it is configured to receive an entry from the user corresponding to the user's selection;

a judgment unit configured to designate the tag associated with each article selected by the user for one of validation or invalidation;

an invalidation unit configured to collectively invalidate all wireless tags designated to be invalidated by the judgment unit prior to a checkout process of the transaction; and a checkout processing unit configured to execute the checkout process of the transaction after the invalidation unit invalidates all wireless tags judged to be invalidated.

10. The article sales data processing apparatus of claim 9, wherein the invalidation unit collectively invalidates a plurality of wireless tags prior to the checkout process.

11. The article sales data processing apparatus of claim 10, wherein the invalidation unit invalidates the plurality of wireless tags nearly simultaneously.

12. The article sales data processing apparatus of claim 9, further comprising a delete key configured to activate the invalidation unit.

13. The article sales data processing apparatus of claim 9, further comprising adding a delete flag to the sales data associated with each article selected by the user for invalidation; and wherein the invalidation unit is configured to collectively invalidate all wireless tags including sales data with the delete flag.

14. The articles sales data processing apparatus of claim 9, wherein the sales data includes at least one of price, quantity, and article name.

15. A method for invalidating a wireless tag comprising:

collectively reading a plurality of wireless tags at a checkout terminal, each wireless tag associated with an article for sale, each wireless tag includes sales data for each associated article;

displaying on a display the sales data associated with each article;

providing for selection of a checkout key, selection of the checkout key initiates a checkout process, the checkout process provides for designating one or more of the displayed articles by a user;

after the checkout key is selected, changing the display so that it is configured to receive an entry from the user corresponding to the displayed articles designated by the user;

one of collectively invalidating or not invalidating the wireless tag of each designated article prior to completion of the checkout process; and completing the checkout process including collectively consummating a sale for each article associated with each wireless tag read.

16. The method for invalidating a wireless tag of claim 15, further comprising substantially simultaneously invalidating the wireless tag of each designated article.

17. The method for invalidating a wireless tag of claim 15, further comprising adding a delete flag to the sales data associated with each designated article and invalidating each wireless tag that includes the delete flag.

18. The method for invalidating a wireless tag of claim 15, further comprising substantially simultaneously consummating a sale for each article associated with each wireless tag read.

19. The method for invalidating a wireless tag of claim 15, further comprising designating one or more of the displayed articles by entering touch inputs on the display.

20. The method for invalidating a wireless tag of claim 15, further comprising collectively reading the wireless tags substantially simultaneously with a tag antenna plate.

* * * * *